United States Patent
Jaipuria et al.

(10) Patent No.: US 11,100,372 B2
(45) Date of Patent: Aug. 24, 2021

(54) TRAINING DEEP NEURAL NETWORKS WITH SYNTHETIC IMAGES

(71) Applicant: Ford Global Technologies, LLC, Dearborn, MI (US)

(72) Inventors: Nikita Jaipuria, Union City, CA (US); Rohan Bhasin, Santa Clara, CA (US); Shubh Gupta, Fremont, CA (US); Gautham Sholingar, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 24 days.

(21) Appl. No.: 16/678,708

(22) Filed: Nov. 8, 2019

(65) Prior Publication Data

US 2021/0142116 A1    May 13, 2021

(51) Int. Cl.
| | |
|---|---|
| *G06K 9/00* | (2006.01) |
| *G06K 9/62* | (2006.01) |
| *G06T 7/11* | (2017.01) |
| *G06N 3/08* | (2006.01) |
| *G06N 3/04* | (2006.01) |

(52) U.S. Cl.
CPC ......... *G06K 9/6262* (2013.01); *G06K 9/6256* (2013.01); *G06K 9/6267* (2013.01); *G06N 3/0454* (2013.01); *G06N 3/08* (2013.01); *G06T 7/11* (2017.01); *G06T 2207/20081* (2013.01); *G06T 2207/20084* (2013.01)

(58) Field of Classification Search
CPC .. G06K 9/6262; G06K 9/6256; G06K 9/6267; G06N 3/08; G06N 3/0454; G06T 7/11; G06T 2207/20084; G06T 2207/20081
See application file for complete search history.

(56) References Cited

U.S. PATENT DOCUMENTS

| | | | |
|---|---|---|---|
| 10,186,038 B1 | 1/2019 | Kluckner et al. | |
| 2018/0276825 A1 | 9/2018 | Dai et al. | |
| 2019/0130220 A1* | 5/2019 | Zou | G06K 9/6274 |
| 2019/0147582 A1 | 5/2019 | Lee et al. | |
| 2019/0286938 A1* | 9/2019 | Backhus | G06K 9/6256 |
| 2019/0384994 A1* | 12/2019 | Frossard | G06N 3/0454 |

OTHER PUBLICATIONS

Xi Guo, et al., "GAN-Based Virtual-to-Real Image Translation for Urban Scene Semantic Segmentation", ScienceDirect Neurocomputing, retrieved from URL: https://doi.org/10.1016/j.neucom.2019.01.115 (5 pages).

* cited by examiner

*Primary Examiner* — Ping Y Hsieh
(74) *Attorney, Agent, or Firm* — Frank A. MacKenzie; Bejin Bieneman PLC (57) ABSTRACT

The present disclosure discloses a system and a method. The system and the method generate, via a deep neural network, a first synthetic image based on a simulated image, generate a segmentation mask based on the synthetic image, compare the segmentation mask with a ground truth mask of the synthetic image, update the deep neural network based on the comparison, and generate, via the updated deep neural network, a second synthetic image based on the simulated image.

20 Claims, 6 Drawing Sheets

TRAINING DEEP NEURAL NETWORKS WITH SYNTHETIC IMAGES

BACKGROUND

Deep neural networks (DNNs) can be used to perform many image understanding tasks, including classification, segmentation, and captioning. Typically, DNNs require large amounts of training images (tens of thousands to millions). Additionally, these training images typically need to be annotated for the purposes of training and prediction.

DETAILED DESCRIPTION

A system comprises a computer including a processor and a memory, and the memory including instructions such that the processor is programmed to generate, via a deep neural network, a first synthetic image based on a simulated image, generate a segmentation mask based on the synthetic image, compare the segmentation mask with a ground truth mask of the synthetic image, update the deep neural network based on the comparison, and generate, via the updated deep neural network, a second synthetic image based on the simulated image.

In other features, the processor is further programmed to compare, via a Siamese neural network, the segmentation mask with the ground truth mask.

In other features, the simulated image depicts a plurality of objects.

In other features, the segmentation mask comprises a binary mask that classifies similar objects of the plurality of objects as a single instance.

In other features, the simulated image is generated by a gaming engine.

In other features, the deep neural network comprises a deconvolutional neural network.

In other features, the processor is further programmed to determine a contrastive loss based on the comparison, and update the deep neural network based on the contrastive loss.

In other features, the processor is further programmed to update at least one weight associated with a neuron of the deep neural network.

In other features, the processor is further programmed to evaluate the second synthetic image, and generate a prediction indicative of whether the second synthetic image is machine-generated or is sourced from a real data distribution.

In other features, the processor is further programmed to generate feedback based on the prediction, and update at least one weight associated with a neuron of the deep neural network when the prediction indicates that the second synthetic image is machine-generated.

In other features, the processor is further programmed to evaluate the second synthetic image via a convolutional neural network.

A method comprises generating, via a deep neural network, a first synthetic image based on a simulated image, generating a segmentation mask based on the synthetic image, comparing the segmentation mask with a ground truth mask of the synthetic image, updating the deep neural network based on the comparison, and generating, via the updated deep neural network, a second synthetic image based on the simulated image.

In other features, the method includes comparing, via a Siamese neural network, the segmentation mask with the ground truth mask.

In other features, the simulated image depicts a plurality of objects.

In other features, the segmentation mask comprises a binary mask that classifies similar objects of the plurality of objects as a single instance.

In other features, the simulated image is generated by a gaming engine.

In other features, the deep neural network comprises a deconvolutional neural network.

In other features, the method includes determining a contrastive loss based on the comparison, and updating the deep neural network based on the contrastive loss.

In other features, the method includes updating at least one weight associated with a neuron of the deep neural network.

In other features, the method includes evaluating the second synthetic image, and generating a prediction indicative of whether the second synthetic image is machine-generated or is sourced from a real data distribution.

Autonomous vehicles typically employ perception algorithms, or agents, to perceive the environment around the vehicle. However, training the perception algorithms typically requires large amounts of data. Gaming engines can be used to simulate data, such as synthetic images, that depict objects of interest to the perception algorithms. The objects of interest may include other vehicles, trailers, pedestrians, street markings, signs, or the like. However, the synthetic data may not appear "real." As a result, the training of perception algorithms using synthetic data may not correspond to the training of perception algorithms using real, i.e., non-generated, data.

In some instances, generative adversarial networks (GANs) are used to transform simulated data to appear more photorealistic. However, the position, size, and/or shape of the objects within the simulated data are not preserved during transformation, which can render ground truth labels generated from simulation unusable for training purposes.

The present disclosure discloses an adversarial neural network that compares a segmentation mask with a ground truth mask to improve image translation, such as simulation-to-real. For example, the adversarial neural network of the present disclosure can generate photorealistic images from simulated images and maintain ground truth for training purposes. As discussed herein, the adversarial neural network can include a generator that generates a synthetic image based on a simulated input image. A segmentor generates a segmentation mask based on the synthetic image, and a Siamese network compares the segmentation mask to a ground truth mask of the simulated input image. Based on the comparison, the Siamese network generates a contrastive loss output that is provided to the generator. The generator can be updated based on the contrastive loss output to mitigate object ground truth loss, such as a size, a position, and a shape of the objects, during image translation.

While the present disclosure describes a vehicle system and a server, it is understood that any suitable computer system may be used to perform the techniques and/or the functionality of the adversarial neural network described herein. Additionally, the techniques described herein may including training a generator for image generating purposes, which can result in improved processing efficiencies within vehicle systems. For example one or more neural networks used within the vehicle systems may be trained with the generator described herein to improve the performance of the neural networks.

Figure 1:
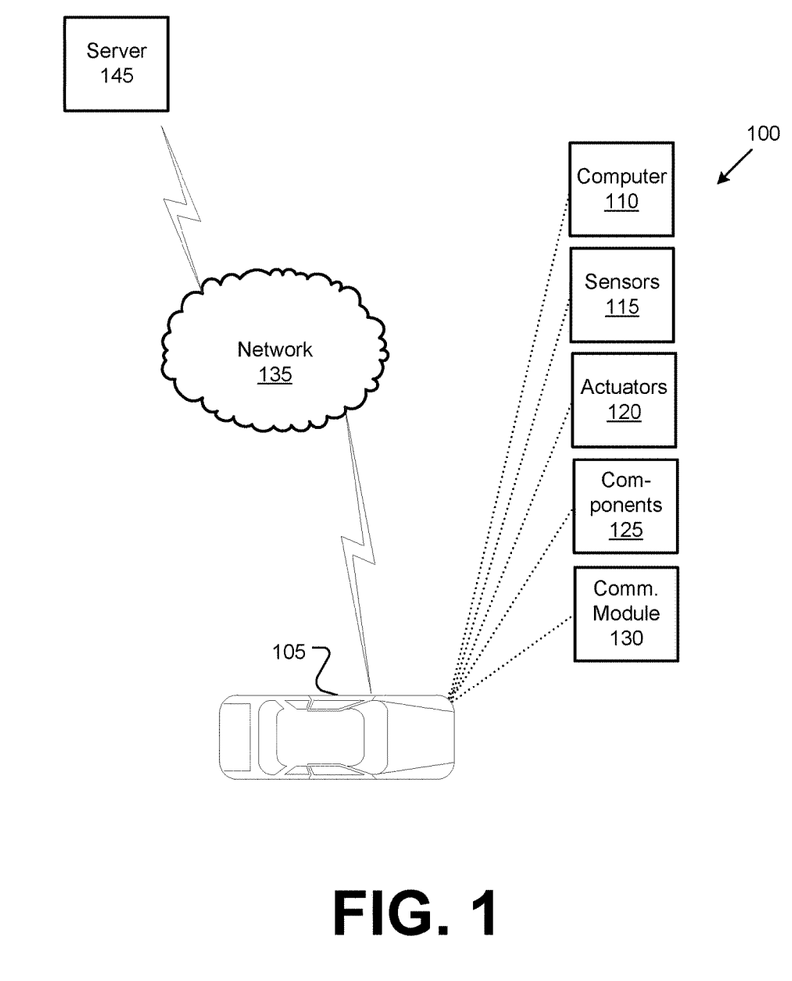
FIG. 1 is a diagram of an example system for training an adversarial network.

FIG. 1 is a block diagram of an example vehicle system 100. The system 100 includes a vehicle 105, which is a land vehicle such as a car, truck, etc. The vehicle 105 includes a computer 110, vehicle sensors 115, actuators 120 to actuate various vehicle components 125, and a vehicle communications module 130. Via a network 135, the communications module 130 allows the computer 110 to communicate with a server 145.

The computer 110 includes a processor and a memory. The memory includes one or more forms of computer-readable media, and stores instructions executable by the computer 110 for performing various operations, including as disclosed herein.

The computer 110 may operate a vehicle 105 in an autonomous, a semi-autonomous mode, or a non-autonomous (manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via the vehicle 105 communications module 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc. Further, the computer 110 may communicate, via the vehicle 105 communications module 130, with a navigation system that uses the Global Position System (GPS). As an example, the computer 110 may request and receive location data of the vehicle 105. The location data may be in a known form, e.g., geo-coordinates (latitudinal and longitudinal coordinates).

The computer 110 is generally arranged for communications on the vehicle 105 communications module 130 and also with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the computer 110 may transmit messages to various devices in the vehicle 105 and/or receive messages from the various devices, e.g., vehicle sensors 115, actuators 120, vehicle components 125, a human machine interface (HMI), etc. Alternatively or additionally, in cases where the computer 110 actually comprises a plurality of devices, the vehicle 105 communications network may be used for communications between devices represented as the computer 110 in this disclosure. Further, as mentioned below, various controllers and/or vehicle sensors 115 may provide data to the computer 110.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles 106), etc., relative to the location of the vehicle 105. The vehicle sensors 115 may further include camera sensor(s) 115, e.g. front view, side view, rear view, etc., providing images from a field of view inside and/or outside the vehicle 105.

The vehicle 105 actuators 120 are implemented via circuits, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle-to-vehicle (V2V) or vehicle-to-infrastructure (V2X) wireless communications to another vehicle, to (typically via the network 135) a remote server 145. The module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth®, IEEE 802.11, dedicated short range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN) and/or wide area networks (WAN), including the Internet, providing data communication services.

A computer 110 can receive and analyze data from sensors 115 substantially continuously, periodically, and/or when instructed by a server 145, etc. Further, object classification or identification techniques can be used, e.g., in a computer 110 based on lidar sensor 115, camera sensor 115, etc., data, to identify a type of object, e.g., vehicle, person, rock, pothole, bicycle, motorcycle, etc., as well as physical features of objects.

Figure 2:
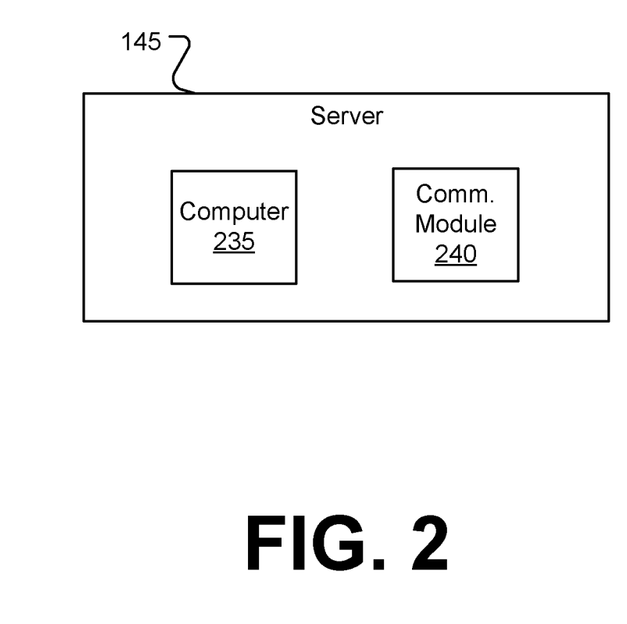
FIG. 2 is a diagram of an example server within the system.

FIG. 2 is a block diagram of an example server 145. The server 145 includes a computer 235 and a communications module 240. The computer 235 includes a processor and a memory. The memory includes one or more forms of computer-readable media, and stores instructions executable by the computer 235 for performing various operations, including as disclosed herein. The communications module 240 allows the computer 235 to communicate with other devices, such as the vehicle 105.

Figure 3:
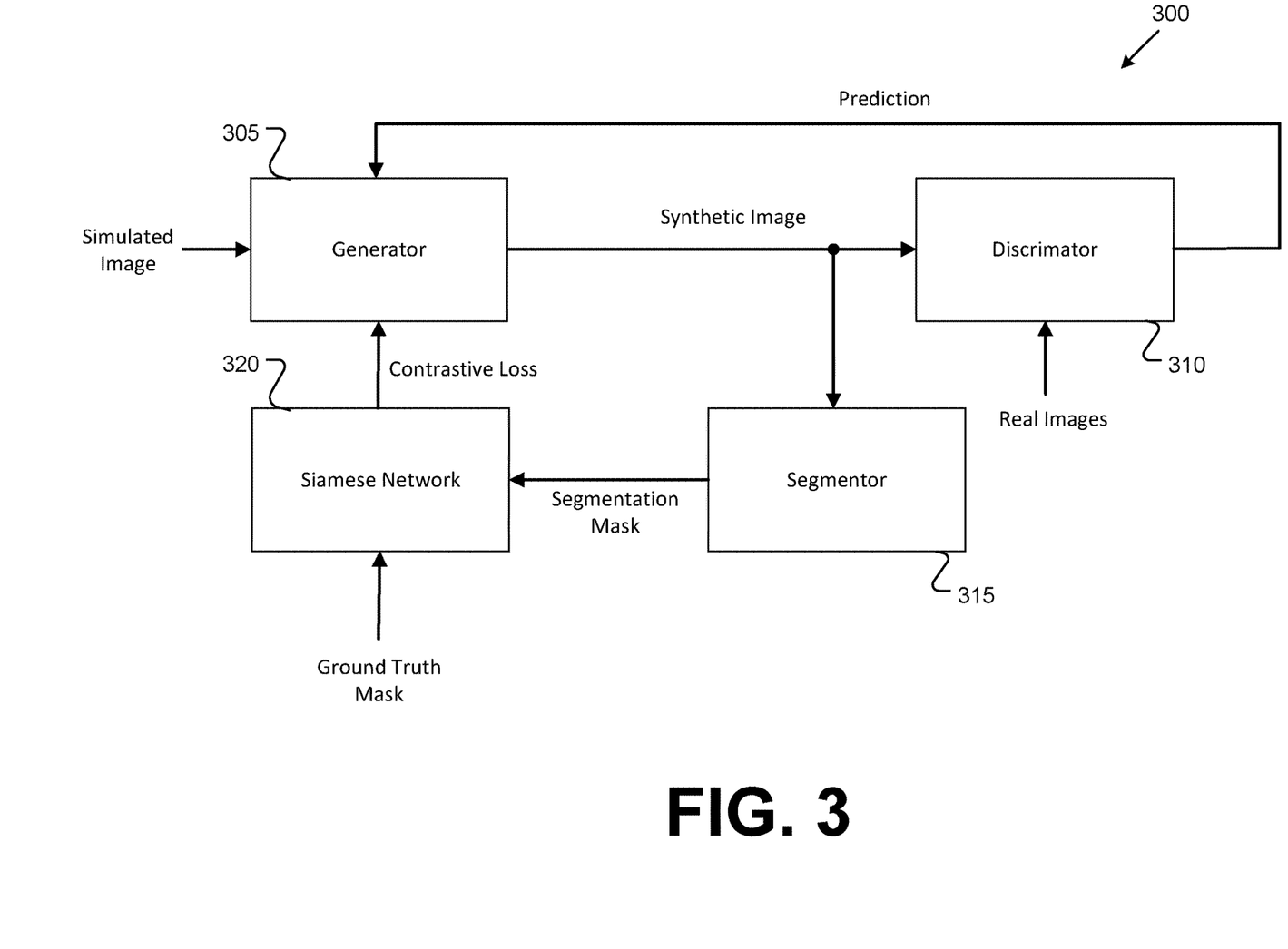
FIG. 3 is a diagram of an example adversarial network.

FIG. 3 is a diagram of an example adversarial neural network 300. The adversarial neural network 300 can be a software program that can be loaded in memory and executed by a processor in the vehicle 105 and/or the server 145, for example. As shown, the adversarial neural network 300 includes a generator 305, a discriminator 310, a segmentor 315, and a Siamese network 320. Within the present context, the generator 305 and the discriminator 310 comprise a generative adversarial network (GAN). The GAN is a deep neural network that employs a class of artificial intelligence algorithms used in machine learning and implemented by a system of two neural networks contesting each other in an adversarial zero-sum game framework.

In an example implementation, the generator 305 receives an input image and generates a synthetic image based on the input image. For instance, the generator 305 receives a simulated red-green-blue (RGB) image including one or more features or objects depicted therein. Using the simulated image, the generator 305 generates a synthetic image including features or objects depicted within the input image. Within the present context, the synthetic image may be an image-to-image translation of the simulated image, e.g., the input image is translated from one domain (simulation) to another domain (real). In one or more implementations, the generator 305 may comprise a deconvolutional neural network. However, it is understood that other neural networks may be used in accordance with the present disclosure.

The discriminator 310 is configured to receive an image, evaluate the received image, and generate a prediction indicative of whether the received image is machine-generated by the generator 305 or is sourced from a real data distribution. As shown in FIG. 3, the discriminator 310 receives synthetic images generated by the generator 305 and images from a real data distribution as input. In one or more implementations, the discriminator may comprise a convolutional neural network. However, it is understood that other neural networks may be used in accordance with the present disclosure.

The training of the generator 305 may use reinforcement learning to train the generative model. Reinforcement learning is a type of dynamic programming that trains algorithms using a system of reward and punishment. A reinforcement learning algorithm, or reinforcement learning agent, learns by interacting with its environment. The agent receives rewards by performing correctly and penalties for performing incorrectly. For instance, the reinforcement learning agent learns without intervention from a human by maximizing the reward and minimizing the penalty.

The segmentor 315 receives the synthetic image and generates a mask based on the synthetic image. The mask may comprise a binary mask that classifies features or objects detected within the synthetic image. In an example implementation, the segmentor 315 can generate a semantic segmentation mask using semantic segmentation techniques that classifies similar features or objects as a single instance. For example, each car identified within an image is classified as a single instance. In another example, each pedestrian identified within an image is classified as a single instance. In one or more implementations, the segmentor 315 may comprise a Mask R-convolutional neural network (Mask R-CNN). However, it is understood that the segmentor 315 may comprise other suitable neural networks configured to classify similar features or objects depicted within an image as a single instance.

The Siamese network 320 receives, as input, the segmentation mask generated by the segmentor 315 and a ground truth mask of the input image, i.e., the image input to the generator 305. The ground truth mask represents a binary mask that classifies similar features or objects as a single instance depicted within the simulated input image. The Siamese network 320 compares the ground truth mask to the generated segmentation mask and generates a contrastive loss output representing a difference between the ground truth mask and the generated segmentation mask.

As shown in FIG. 3, the contrastive loss output is provided to the generator 305. The generator 305 can use the contrastive loss output to update one or more weights of the generator 305 to minimize the contrastive loss output. For example, the generator 305 may update one or more weights within the generator 305 using backpropagation, or the like. The generator 305 may also update one or more weights based on the prediction generated by the discriminator 310. In one or more implementations, based on the updates to the generator 305, the generator 305 is configured to generate another synthetic image that includes the object corresponding to the ground truth mask.

Figure 4:
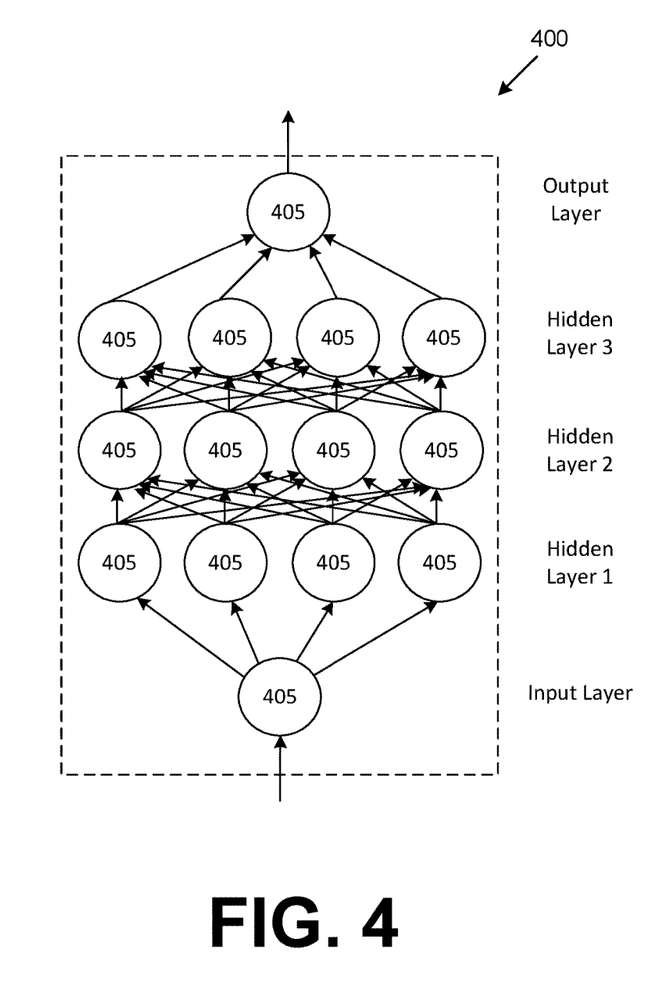
FIG. 4 is a diagram of an example deep neural network.

FIG. 4 is a diagram of an example deep neural network (DNN) 400. The DNN 400 may be representative of the generator 305, the discriminator 310, the segmentor 315, and/or the Siamese network 320 described above. The DNN 400 includes multiple nodes 405, and the nodes 405 are arranged so that the DNN 400 includes an input layer, one or more hidden layers, and an output layer. Each layer of the DNN 400 can include a plurality of nodes 405. While FIG. 4 illustrates three (3) hidden layers, it is understood that the DNN 400 can include additional or fewer hidden layers. The input and output layers may also include more than one (1) node 405.

The nodes 405 are sometimes referred to as artificial neurons 405, because they are designed to emulate biological, e.g., human, neurons. A set of inputs (represented by the arrows) to each neuron 405 are each multiplied by respective weights. The weighted inputs can then be summed in an input function to provide, possibly adjusted by a bias, a net input. The net input can then be provided to activation function, which in turn provides a connected neuron 405 an output. The activation function can be a variety of suitable functions, typically selected based on empirical analysis. As illustrated by the arrows in FIG. 4, neuron 405 outputs can then be provided for inclusion in a set of inputs to one or more neurons 405 in a next layer.

The DNN 400 can be trained to accept data as input and generate an output based on the input. The DNN 400 can be trained with ground truth data, i.e., data about a real-world condition or state. For example, the DNN 400 can be trained with ground truth data or updated with additional data by a processor. Weights can be initialized by using a Gaussian distribution, for example, and a bias for each node 405 can be set to zero. Training the DNN 400 can including updating weights and biases via suitable techniques such as backpropagation with optimizations. Ground truth data can include, but is not limited to, data specifying objects within an image or data specifying a physical parameter, e.g., angle, speed, distance, or angle of object relative to another object. For example, the ground truth data may be data representing objects and object labels.

Figure 5:
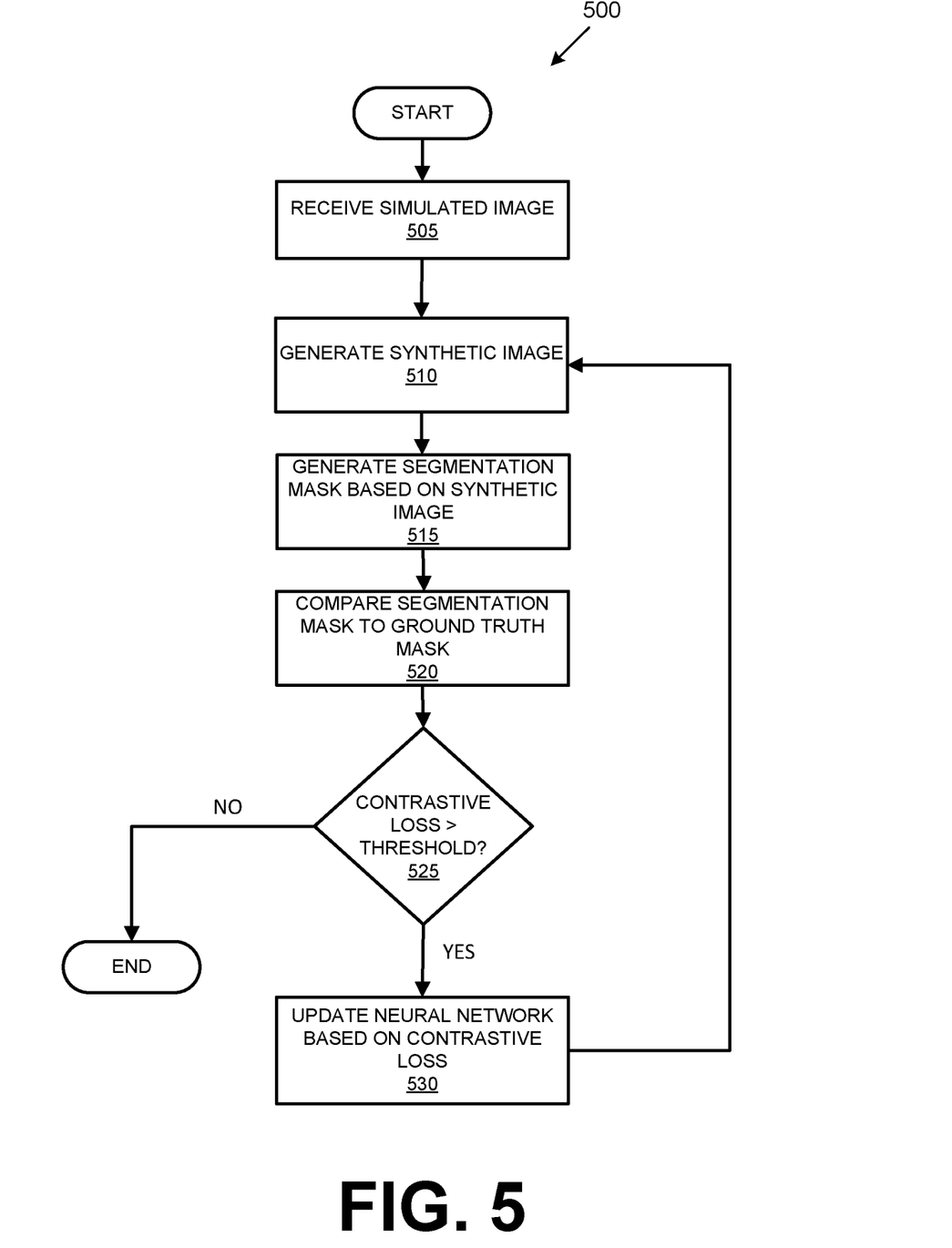
FIG. 5 is a flow diagram illustrating an example process for training an adversarial network.

FIG. 5 is a flowchart of an exemplary process 500 for training a generator using synthetic image generation within an adversarial neural network. Blocks of the process 500 can be executed by the computer 110 or the computer 235. The process 500 begins at block 505 in which a simulated input image is received. As described above, the generator 305 receives a simulated input image. The simulated input image may be generated by a gaming engine, or the like. At block 510, the generator 305 generates a synthetic image, e.g., machine-generated image, based on the simulated input image. The synthetic image can include one or more objects depicted within the simulated input image. The segmentor 315 generates a segmentation mask based on the synthetic image at block 515. As discussed above, the segmentation mask is a binary mask that classifies similar features or objects as a single instance.

At block 520, the segmentation mask corresponding to the synthetic image is compared with the ground truth mask of the simulated image. For instance, the Siamese network 320 is configured to generate a contrastive loss output representing a difference between the ground truth mask and the generated segmentation mask. At block 525, a determination is made whether the contrastive loss output is greater than a predetermined error threshold. If the contrastive loss output is less than or equal to the predetermined error threshold, the process 500 ends.

Otherwise, the generator 305 is updated using the contrastive loss output at block 530 and the process 500 returns to block 510. For instance, one or more weights associated with the nodes, such as nodes 405, of the generator 305 are updated via suitable techniques such as backpropagation with optimizations. The contrastive loss may include one or more gradients of interest between the segmentation mask and the ground truth mask, and the weights of the generator 305 can be updated based on the gradients of interest. Additional synthetic images may be generated by the generator 305 until the contrastive loss is less than or equal to the predetermined error threshold.

Figure 6:
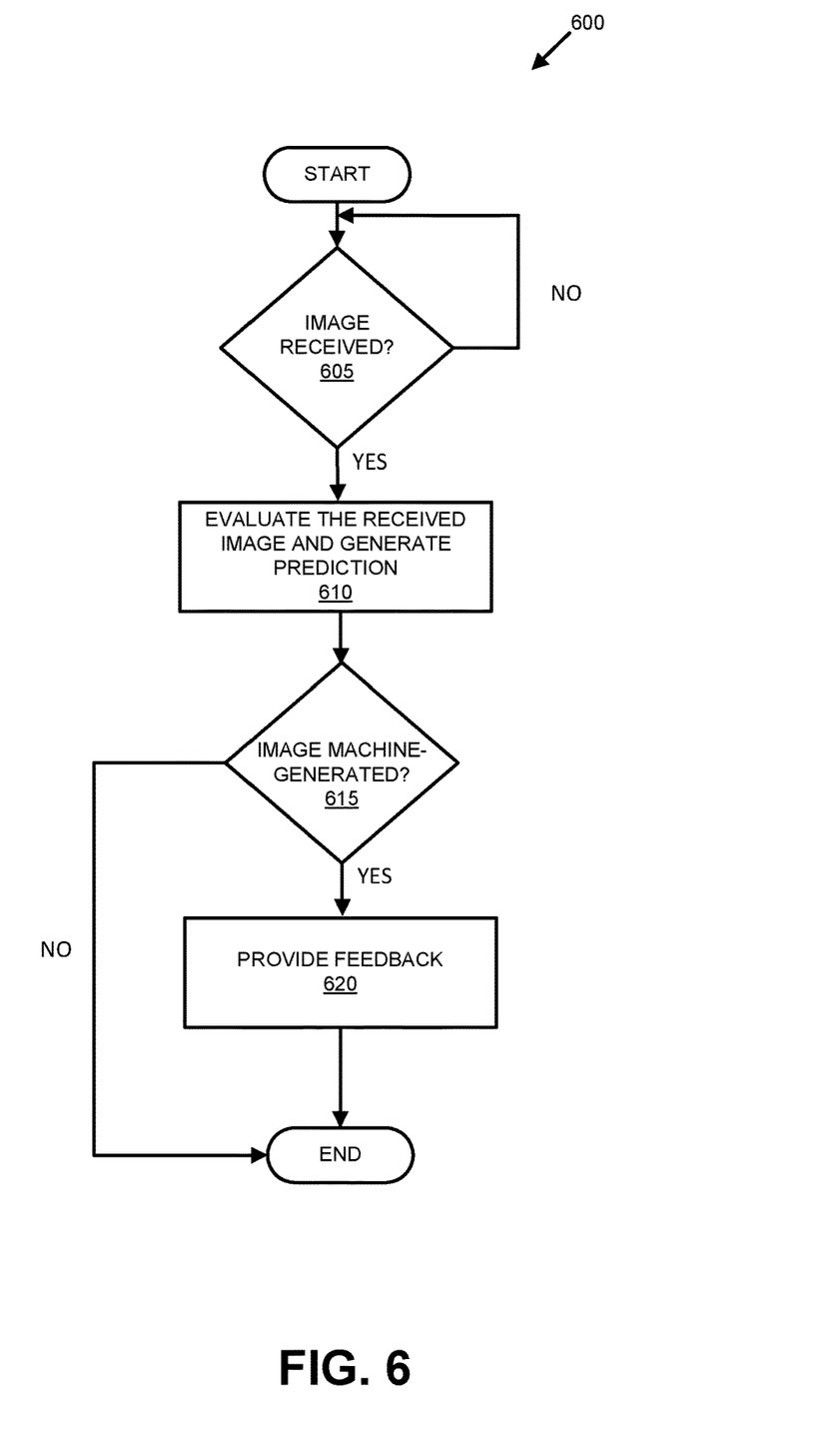
FIG. 6 is a flow diagram illustrating an example process for determining whether an image is sourced from a real data distribution or is machine-generated.

FIG. 6 is a flowchart of an exemplary process 600 for generating a prediction indicative of whether an image is machine-generated or is sourced from a real data distribution. Blocks of the process 600 can be executed by the computer 110 or the computer 235. The process 600 begins at block 605 in which a determination of whether an image is received. In an example implementation, the discriminator 310 receives an image. The image may be a synthetic image generated by the generator 305 or an image from a real data distribution. If no image is received, the process 600 returns to block 605.

Otherwise, at block 610, the discriminator 310 evaluates the received image and generates a prediction based on the received image. For example, the discriminator 310 applies one or more convolutional neural network techniques to the received image to determine a probability that the evaluated image is synthetic or from a real data distribution. At block 615, a determination is made whether the received image is synthetic, e.g., machine-generated. For example, if the probability is greater than a predetermined threshold, the discriminator 310 determines that the image is machine-generated.

If the determination is that the received image is determined not to be synthetic, the process 600 ends. If the determination is that the received image is determined to be synthetic, the discriminator 310 provides feedback to the generator 305 at block 625. In some implementations, the gradients of the received image are determined and provided to the generator 305. For example, backpropagation techniques can be used to identify gradients of interest within the received image. The gradients can then be provided to the generator 305 such that the weights of the generator 305 can be updated with respect to the gradients.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising a computer including a processor and a memory, the memory including instructions such that the processor is programmed to:
   generate, via a deep neural network, a first synthetic image based on a machine-generated simulated image;
   generate a segmentation mask based on the synthetic image;
   compare the segmentation mask with a ground truth mask of the synthetic image;
   update the deep neural network based on the comparison; and
   generate, via the updated deep neural network, a second synthetic image based on the simulated image.

2. The system of claim 1, wherein the processor is further programmed to:
   compare, via a Siamese neural network, the segmentation mask with the ground truth mask.

3. The system of claim 1, wherein the simulated image depicts a plurality of objects.

4. The system of claim 3, wherein the segmentation mask comprises a binary mask that classifies similar objects of the plurality objects as a single instance.

5. The system of claim 1, wherein the simulated image is generated by a gaming engine.

6. The system of claim 1, wherein the deep neural network comprises a deconvolutional neural network.

7. The system of claim 1, wherein the processor is further programmed to:
   determine a contrastive loss based on the comparison; and
   update the deep neural network based on the contrastive loss.

8. The system of claim 1, wherein the processor is further programmed to:
   update at least one weight associated with a neuron of the deep neural network.

9. The system of claim 1, wherein the processor is further programmed to:
   evaluate the second synthetic image; and
   generate a prediction indicative of whether the second synthetic image is machine-generated or is sourced from a real data distribution.

10. The system of claim 9, wherein the processor is further programmed to:
    generate feedback based on the prediction; and
    update at least one weight associated with a neuron of the deep neural network when the prediction indicates that the second synthetic image is machine-generated.

11. The system of claim 9, wherein the processor is further programmed to:
    evaluate the second synthetic image via a convolutional neural network.

12. A method comprising:
generating, via a deep neural network, a first synthetic image based on a machine-generated simulated image;
generating a segmentation mask based on the synthetic image;
comparing the segmentation mask with a ground truth mask of the synthetic image;
updating the deep neural network based on the comparison; and
generating, via the updated deep neural network, a second synthetic image based on the simulated image.

13. The method of claim 12, further comprising:
comparing, via a Siamese neural network, the segmentation mask with the ground truth mask.

14. The method of claim 12, wherein the simulated image depicts a plurality of objects.

15. The method of claim 14, wherein the segmentation mask comprises a binary mask that classifies similar objects of the plurality of objects as a single instance.

16. The method of claim 12, wherein the simulated image is generated by a gaming engine.

17. The method of claim 12, wherein the deep neural network comprises a deconvolutional neural network.

18. The method of claim 12, further comprising:
determining a contrastive loss based on the comparison; and
updating the deep neural network based on the contrastive loss.

19. The method of claim 12, further comprising:
updating at least one weight associated with a neuron of the deep neural network.

20. The method of claim 12, further comprising:
evaluating the second synthetic image; and
generating a prediction indicative of whether the second synthetic image is machine-generated or is sourced from a real data distribution.

* * * * *